(12) United States Patent
Kube (10) Patent No.: US 10,556,238 B2
(45) Date of Patent: Feb. 11, 2020

(54) DRIVE CONTROL METHOD AND DRIVE SYSTEM OPERATING ACCORDING TO SAID METHOD

(71) Applicant: SIEMENS AKTIENGESELLSCHAFT, München (DE)

(72) Inventor: Andreas Kube, Aachen (DE)

(73) Assignee: Siemens Aktiengesellschaft, München (DE)

( * ) Notice: Subject to any disclaimer, the term of this patent is extended or adjusted under 35 U.S.C. 154(b) by 870 days.

(21) Appl. No.: 14/761,189

(22) PCT Filed: Jan. 15, 2014

(86) PCT No.: PCT/EP2014/050676
§ 371 (c)(1),
(2) Date: Jul. 15, 2015

(87) PCT Pub. No.: WO2014/111410
PCT Pub. Date: Jul. 24, 2014

(65) Prior Publication Data
US 2015/0367353 A1     Dec. 24, 2015

(30) Foreign Application Priority Data

Jan. 16, 2013   (DE) .......................... 10 2013 200 578

(51) Int. Cl.
*B02C 25/00*     (2006.01)
*B02C 15/02*     (2006.01)
(Continued)

(52) U.S. Cl.
CPC ............ *B02C 25/00* (2013.01); *B02C 15/007* (2013.01); *B02C 15/02* (2013.01); *B02C 15/06* (2013.01);
(Continued)

(58) Field of Classification Search
CPC ....... B02C 25/00; B02C 15/04; B02C 15/007; H02P 31/00; H02P 31/12
(Continued)

(56) References Cited

U.S. PATENT DOCUMENTS 3,591,094 A * 7/1971 Gauer ..................... B02C 15/04
                                                              241/121
4,303,205 A * 12/1981 Geiger .................... B02C 25/00
                                                              241/17
(Continued)

FOREIGN PATENT DOCUMENTS

DE     10 2007 006 092     8/2008
DE     10 2007 033 256     1/2009
(Continued)

OTHER PUBLICATIONS

International Search Report issued by the European Patent Office in International Application PCT/EP2014/050676.

*Primary Examiner* — Adam J Eiseman
*Assistant Examiner* — Smith Oberto Bapthelus
(74) *Attorney, Agent, or Firm* — Henry M. Feiereisen LLC (57) ABSTRACT

A method for drive control of a vertical mill having a grinding plate rotatable about the vertical axis by a drive train composed of an electric motor and a gearbox is disclosed. At least the electric motor and the grinding plate represent inertia elements in a system that can oscillate and are connected by the gearbox operating as a torsion spring element. A variation in the rotation speed of at least one of the inertia elements is measured, and the electric motor is governed by a controller that minimizes the measured variation in the rotation speed. The controller is parameterized for (Continued)

governing the electric motor so as to minimize maximum reaction torques resulting in the gearbox when applying a sinusoidal excitation.

14 Claims, 3 Drawing Sheets

(51) Int. Cl.
    *B02C 15/06*         (2006.01)
    *H02P 31/00*         (2006.01)
    *B02C 15/00*         (2006.01)

(52) U.S. Cl.
    CPC ........ *H02P 31/00* (2013.01); *B02C 2015/008* (2013.01)

(58) Field of Classification Search
    USPC .......................................... 241/36, 117–120
    See application file for complete search history.

(56) References Cited

U.S. PATENT DOCUMENTS

| | | | | |
|---|---|---|---|---|
| 4,715,544 | A * | 12/1987 | Folsberg | B02C 15/001 241/119 |
| 5,076,381 | A | 12/1991 | Daido et al. | |
| 5,189,624 | A * | 2/1993 | Barlow | G05B 19/182 700/169 |
| 5,472,651 | A * | 12/1995 | Peterson | B30B 11/005 264/40.6 |
| 6,619,086 | B1 * | 9/2003 | Ikeda | B21B 37/50 700/152 |
| 7,926,754 | B2 * | 4/2011 | Hoffmann | B02C 15/006 241/117 |
| 8,291,736 | B2 * | 10/2012 | Schmidt | B21B 37/00 72/10.3 |
| 9,789,488 | B2 * | 10/2017 | Klotzek | B02C 15/007 |
| 9,789,489 | B2 * | 10/2017 | Kube | B02C 15/007 |
| 9,868,122 | B2 * | 1/2018 | Fornefeld | B02C 15/006 |
| 2009/0087523 | A1 * | 4/2009 | Freeman | A23L 7/10 426/233 |
| 2009/0235707 | A1 * | 9/2009 | Schmidt | B21B 37/00 72/11.1 |
| 2010/0059611 | A1 * | 3/2010 | Berger | B02C 15/00 241/30 |
| 2010/0193616 | A1 * | 8/2010 | Berger | B02C 15/006 241/30 |
| 2011/0117067 | A1 * | 5/2011 | Esteghlalian | C09K 8/035 424/93.21 |
| 2011/0121772 | A1 * | 5/2011 | Berger | B02C 15/00 318/504 |
| 2013/0001341 | A1 * | 1/2013 | Lessard | B02C 15/006 241/36 |
| 2014/0281206 | A1 * | 9/2014 | Crawford | G11C 11/406 711/106 |
| 2015/0336106 | A1 * | 11/2015 | Klotzek | B02C 15/007 241/30 |
| 2015/0336107 | A1 * | 11/2015 | Kube | B02C 15/007 241/30 |
| 2015/0349697 | A1 * | 12/2015 | Kube | B02C 15/007 318/494 |
| 2015/0367353 | A1 * | 12/2015 | Kube | B02C 15/007 241/30 |
| 2016/0023218 | A1 * | 1/2016 | Kube | B02C 15/007 241/30 |

FOREIGN PATENT DOCUMENTS

| | | |
|---|---|---|
| DE | 102009057732 A1 | 6/2011 |
| EP | 0350818 A2 | 1/1990 |
| EP | 2 295 147 | 3/2011 |
| EP | 2 492 016 | 8/2012 |
| JP | S63218831 A | 9/1988 |
| JP | H0584447 A | 4/1993 |
| JP | H0584448 A | 4/1993 |
| JP | H05104013 A | 4/1993 |
| JP | H09 141116 | 6/1997 |
| WO | WO 2008/049545 | 5/2008 |

\* cited by examiner

DRIVE CONTROL METHOD AND DRIVE SYSTEM OPERATING ACCORDING TO SAID METHOD

CROSS-REFERENCES TO RELATED APPLICATIONS

This application is the U.S. National Stage of International Application No. PCT/EP2014/050676, filed Jan. 15, 2014, which designated the United States and has been published as international Publication No. WO 2014/111410 A1 and which claims the priority of German Patent Application, Serial No. 10 2013 200 578.4, filed Jan. 16, 2013, pursuant to 35 U.S.C. 119(a)-(d).

BACKGROUND OF THE INVENTION

The present invention relates to a drive control method, namely a drive control method for a heavy-duty drive, in particular a heavy-duty drive of a vertical mill designed for crushing brittle materials, for example raw cement material, and a corresponding drive system operating according to said method.

Vertical mills of the type cited above comprising a grinding plate rotating about the vertical axis and grinding rollers above the grinding plate tend to be subjected to high mechanical oscillations, since in simple terms the drive train of a vertical mill is an oscillating system in the form of a dual mass oscillator. The grinding plate and all of the units moved by the grinding plate form part of the first mass and the second mass is the rotor of the driving motor. The connection between these two masses is in the form of a gearing which functions in the manner of a torsion spring in the oscillating system. The system is excited to oscillate briefly or even for longer periods of time by a continuous low-frequency load change as a result of the grinding process and occasional varying loads as a result of the grinding process. The resulting forces and torques may be so high that the grinding process has to be stopped in order to avoid damage to the drive train, namely in particular to the electric motor and/or to the gearing or the system as a whole. The reason for the echoing of oscillations in the drive train (drive train oscillations) is that the damping in the drive train (drive train damping) is not sufficient in order to compensate for the oscillation energy introduced from the working machine (grinding machine).

In order to keep such oscillations low, the operator of the mill previously had to design the process parameters, i.e. in particular the contact pressure of the grinding rollers, the composition of the grinding material and the quantity of additional grinding aids, such that the excitation of oscillations remained below a critical level. This leads, however, to undesirable restrictions in the configuration of the process, having a negative effect in many areas. For example, the range of products which are able to be produced by the grinding material which has been respectively obtained, the efficiency of the mill, the required energy use and the cost efficiency are affected. Moreover, such a procedure is highly unreliable as a great deal of experience is required in order to carry out the process correctly and the properties of the ground natural materials are always variable. Thus it repeatedly results in greater torsional oscillations.

In view of this background and due to increasing requirements with regard to availability, efficiency and service life costs (TCO=Total Cost of Ownership) the design and arrangement of the electrical and mechanical components of a drive system and the respective drive train of a heavy-duty drive, in particular a vertical mill, are becoming increasingly important.

Currently, drive systems with a gearing and at least one electric motor in the form of an asynchronous motor, preferably a slip ring motor, as well as a frequency converter supplying the at least one electric motor, represent a preferred solution for vertical mills. In this case, in practice the mill gearings are frequently designed as variants of planetary bevel gear transmissions or planetary spur gear transmissions. The object of the gearing is to absorb the axial grinding forces and to transfer said forces into the substructure, in addition to the rotational speed conversion and torque conversion.

Hitherto, attempts have been made to solve the aforementioned problem by integrating a mechanical element into the drive train, wherein the respective mechanical element or optionally a plurality of mechanical elements is and/or are characterized by a correspondingly high damping effect. Currently couplings, in particular highly resilient elastomer couplings, are used as such elements with a sufficiently high damping effect.

A drawback with this solution is firstly that such a coupling is an expensive wear part. Secondly, the drive train damping achieved by a coupling is implemented by the conversion of oscillation energy into thermal energy which has a negative impact on the energy footprint. Finally, the degree of drive train damping which is able to be achieved by such a coupling is still very small and has been shown to be insufficient in some cases.

SUMMARY OF THE INVENTION

An object of the present invention is accordingly to specify a drive control method for a vertical mill and a drive system operating according to the method which reduces such drive train oscillations, in particular a method and a corresponding device which reduce such drive train oscillations without the use of a coupling or any other mechanical damper in the drive train.

According to one aspect of the invention, the aforementioned object is achieved by a method for the drive control of a vertical mill having a grinding plate which is able to be rotated about the vertical axis, wherein the grinding plate is able to be driven by at least one electric motor and a drive train comprising at least one gearing, wherein at least the electric motor and the grinding plate represent mass inertia elements in an oscillating system which are connected by the gearing acting as a torsion spring element, wherein a rotational speed variation of at least one of the mass inertia elements is detected and wherein the electric motor is governed by a controller minimizing the detected rotational speed variation, wherein the controller for governing the electric motor is parameterized such that upon sinusoidal excitation any resulting maximum reaction torques in the gearing are minimal.

According to another aspect of the invention, the object is also achieved by a drive system and a control device encompassed by the drive system and having the features of the parallel device claim and by a vertical mill or a drive system of a vertical mill with such a control device.

The vertical mill denoted here and occasionally abbreviated hereinafter simply to "mill" comprises a grinding plate which is able to be rotated about the vertical axis and which is able to be driven by at least one electric motor and a drive train comprising at least one gearing and is driven during operation of the mill. In this regard, the configuration of the dual-mass oscillator cited in the introduction is produced with at least the grinding plate as the first mass or first mass inertia element and at least the rotor of the electric motor as the second mass or the second mass inertia element, wherein the two oscillating masses are coupled by the gearing functioning as a torsion spring.

In the method proposed here for the drive control of a vertical mill having a grinding plate which is able to be rotated about the vertical axis, wherein the grinding plate is able to be driven by at least one electric motor and a drive train comprising at least one gearing and wherein at least the electric motor and the grinding plate represent mass inertia elements in an oscillating system which are connected by the gearing acting as a torsion spring element, a rotational speed variation of at least one of the mass inertia elements is detected and the electric motor is governed by means of a controller minimizing the detected rotational speed variation, wherein the controller for governing the electric motor is parameterized such that upon sinusoidal excitation any resulting maximum reaction torques in the gearing are minimal, in particular minimal at any technically relevant frequency or at the excitation frequencies substantially occurring during operation. The governing of the electric motor thus achieved is denoted hereinafter as governing with optimal damping.

In a control device designed for carrying out such a method and possibly one or more embodiments, namely a control device for the drive control of a vertical mill, at least one oscillation-relevant measurement value, for example a measurement value which is suitable as a measurement of the aforementioned rotational speed variations, is able to be supplied to the control device as an input variable. A rotational speed measurement value detected on the electric motor or on the motor shaft or at any other location in the drive train is taken into consideration as the oscillation-relevant measurement value.

In summary, therefore, the invention is a drive control method and a drive control device for a heavy-duty arrangement in the form of a drive system in which the rotational speed of the electric motor is governed by means of the control device, wherein the governing of the rotational speed is characterized in that—without using mechanical damping, such as for example a coupling functioning as an oscillation damper or any other mechanical damper—a damping of the rotational speed of the electric motor results in a damping of torsional oscillations in the drive train.

In this case, a temporal variation of the amplitude of the torsional oscillations in the drive train is understood as damping. If the amplitude is reduced, the damping is positive. If the amplitude is increased, the damping is negative. If the amplitude remains constant, the damping is zero. Damping may have different causes. One possible cause for a positive damping is the conversion of oscillation energy into thermal energy, for example by internal or external frictional processes of moving parts of an oscillating system. The approach set forth here uses a further possibility for producing positive damping.

If the vertical mill is left to its own devices after a limited excitation time, it oscillates ideally as a dual-mass oscillator at its natural frequency and a constant oscillation amplitude. With continuous excitation at the natural frequency, the oscillation amplitude theoretically increases indefinitely. No damping takes place and this actually results in damage to the gearing.

The previously pursued conventional solution consists in complementing the torsion spring—i.e. the gearing—with a damping element (for example in the form of a mechanical damper with oil displacement or a highly resilient elastomer coupling). In the oscillation model, therefore, a spring-damper combination replaces the pure torsion spring element. The damping element counteracts a relative movement of the mass inertia element, namely at least the grinding plate and the rotor of the electric motor. A portion of the oscillation energy in this case is converted into heat in the damping element.

The approach proposed here is based on the recognition that an oscillation in the drive train of the vertical mill is not only associated with a relative movement between the two mass inertia elements. Similarly, a variable (oscillating) rotational speed of each mass inertia element is also produced relative to the temporal mean rotational speed thereof. Therefore, the rotational speed oscillates about the mean rotational speed. In the mass of the rotor of the electric motor, also denoted hereinafter occasionally as the motor mass, the temporal mean rotational speed corresponds to the rotational speed which is respectively desired during operation, which is denoted hereinafter as the desired rotational speed, both in the case of drive solutions which are controlled in terms of rotational speed and also in the case of so-called fixed rotational speed drive solutions.

The approach according to the invention is based on the damping of the oscillation of the rotational speed on the motor mass described herein. In this case, use is made of the fact that stabilizing just one oscillating mass of the oscillating system is sufficient in order to achieve a stabilizing effect on the entire system. It is not necessarily required to act on all of the mass inertia elements at the same time, as is the case in the conventional approach with a mechanical damper.

In order to dampen the oscillation of the rotational speed of the motor mass, measures are taken to counteract a deviation of the actual rotational speed of the motor mass from the respective mean rotational speed (desired rotational speed). This is implemented by the air gap torque acting on the rotor being superimposed by an additional torque. Thus, as before, the output of the mill is generated via the mean air gap torque and the damping of the oscillation of the rotational speed is achieved via the superimposed additional torque.

The advantage of the invention is primarily, therefore, that the damping of the drive train is possible without a mechanical oscillation damper.

This takes place by the torque acting in the air gap of the electric motor (air gap torque) being governed in an appropriate manner in terms of its time curve. This is achieved by means of a controller parameterized with optimal damping and functioning as rotational speed controller, in particular a controller in the form of a PI-controller. A controller parameter with optimal damping or controller parameters with optimal damping is and/or are defined in that the maximum reaction torques in the gearing upon periodic sinusoidal excitation are minimal, in particular are minimal upon periodic sinusoidal excitation at each technically relevant frequency during operation of the vertical mill or at the excitation frequencies occurring substantially during operation.

The degree of damping which is able to be achieved in this manner depends on the accuracy of the rotational speed sensor and on the processing speed of the rotational speed controller which may be designed as a component of a frequency converter, so that the processing speed of the frequency converter and a subsequent power element for activating the electric motor may be taken into consideration. The components used, therefore, have to meet high requirements which hitherto were not required in the field of vertical mills.

Advantageous embodiments of the invention form the subject-matter of the dependent claims. References used here refer to the further embodiment of the subject of the independent claim by the features of the respective dependent claim. They are not to be understood as a waiver to obtaining independent protection of the subject for the combination of features of the dependent claims referred to. Moreover, it is to be assumed with regard to an interpretation of the claims with a more detailed implementation of a feature in a dependent claim that such a limitation is not present in the previous respective claims. Finally, reference should be made to the fact that the method specified here may also be developed so as to correspond to the dependent device claims and vice versa.

If the or each electric motor is supplied by a frequency converter, the resulting desired torque, i.e. the superimposition of an operating torque, based on the desired rotational speed, by an additional torque designed for damping the oscillation of the rotational speed, may be supplied to the frequency converter which now in principle in a manner known per se ensures an activation of the or each electric motor so that the desired torque is produced in the drive train.

The method and the control device operating according to the method are based on automatically determined controller parameters which ensure the activation of the electric motor with optimal damping, i.e. an activation in which upon sinusoidal excitation, as a result of the grinding process, the resulting maximum reaction torques in the gearing are minimal at each technically relevant frequency or excitation frequency substantially occurring during operation. The controller parameters are determined based on an extreme value search in a plurality of known degrees of damping which may be achieved by specific controller parameters. The known degrees of damping have been recorded for very different controller parameters, either previously experimentally on the respective vertical mill or as the result of a simulation of the vertical mill. The greatest degree of damping is sought within the plurality of degrees of damping. This takes place in the extreme value search which finds at least local extreme values or an absolute extreme value. For the extreme value search, methods known per se, for example a gradient method, may be used. The extreme value search is implemented in software and in this regard the invention is also a computer program with program coding means in order to carry out all of the steps of the method described here and hereinafter, if the computer program is implemented on a control device for the drive control of a vertical mill. Moreover, the invention is thus also a digital storage medium with electronically readable control signals which may cooperate with a control device for the drive control of a vertical mill, so that such a method is carried out. Finally, the invention is also a control device for the drive control of a vertical mill, which comprises a processing unit and a memory, wherein such a computer program is loaded into the memory and during operation of the control device is implemented by the processing unit thereof.

An exemplary embodiment of the invention is described in more detail hereinafter with reference to the drawings. Subjects or elements which correspond to one another are provided in all of the figures with the same reference numerals.

The exemplary embodiment is not to be understood as a limitation to the invention. Rather, within the scope of the present disclosure alterations and modifications are also possible, in particular such variants and combinations which, for example, by combining or modifying individual features and/or elements or method steps described in the general or specific part of the description and contained in the claims and/or the drawings, may be derived by the person skilled in the art with reference to the solution of the object and which result in a novel subject or novel method steps and/or subsequent method steps using features which may be combined together.

DETAILED DESCRIPTION OF PREFERRED EMBODIMENTS

Figure 1:
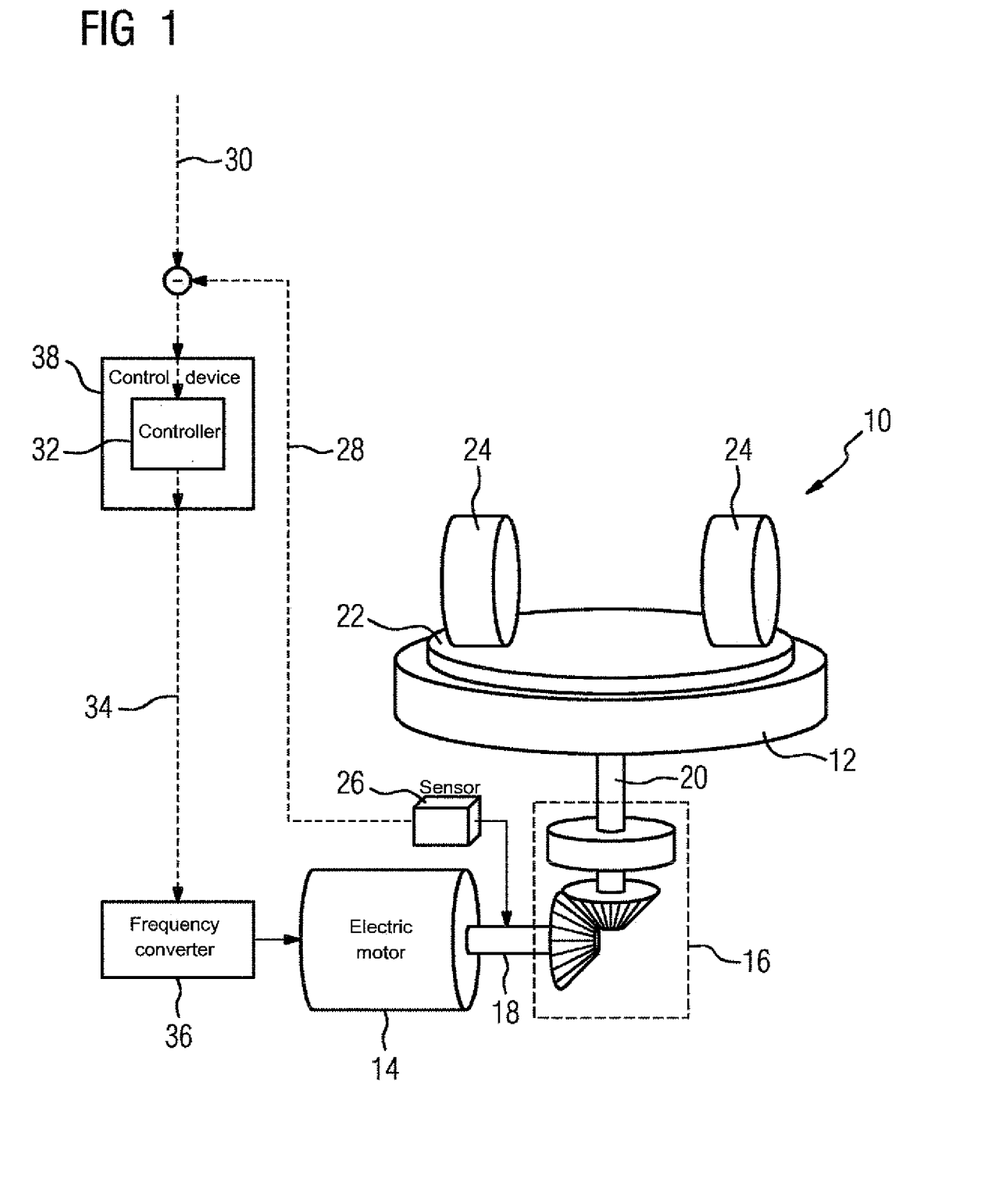
FIG. 1 shows a schematic, highly simplified view of a vertical mill with a grinding plate driven by means of a heavy-duty drive.

The view in FIG. 1 shows in a schematic and highly simplified manner a vertical mill 10 for crushing brittle materials, for example raw cement material. The vertical mill 10 comprises a grinding plate 12 which is able to be rotated about the vertical axis. The grinding plate 12 is driven by means of a heavy-duty drive in the form of at least one motor, in particular at least one electric motor 14, and in the example shown here by means of a gearing 16 located between the or each electric motor 14 and the grinding plate 12. The gearing 16 in this case, without waiver of any further generality, is shown as a bevel gear toothing with an adjoining planetary gear transmission, shown without further details. The gearing 16 may, for example, also comprise a spur gear toothing or the like and/or a planetary gear transmission or the like arranged upstream or adjacent thereto.

The vertical mill 10 comprises at least one driven shaft. In the view in FIG. 1 the vertical mill 10 comprises as a shaft on the drive side a motor shaft 18 and on the output side a grinding plate shaft 20. The electric motor 14 and all means for transmitting the drive force of the electric motor 14 to the grinding plate 12 are denoted as the drive train.

During operation of the vertical mill 10, the or each electric motor 14 sets the grinding plate 12 in rotation. A grinding bed 22, i.e. a mixture of ground material and material to be ground is located on the grinding plate 12 as a result of the grinding process and as a result of materials which are supplied and which are to be ground and milled. The grinding action is achieved by a grinding roller 24 or a plurality of grinding rollers 24 being pressed onto the grinding bed 22 and the rotating grinding plate 12, on the one hand, due to their weight and, on the other hand, optionally also due to additionally applied forces which are applied, for example, by means of a hydraulic cylinder or the like acting on a grinding roller 24 mounted in a pivotably movable manner.

The vertical mill 10 as a whole is an oscillating system and specifically the vertical mill 10 is prone to highly mechanical torsional oscillations in the drive train. The resulting forces and torques may be so high that the mechanical components of the drive train, i.e. for example the gearing 16, are subjected to very high levels of stress or are overstressed.

Hitherto, attempts have been made to counter such torsional oscillations by means of a coupling or the like, for example a highly resilient elastomer coupling. Such a coupling is arranged, for example, between the electric motor 14 and the gearing 16 (not shown). Although such a coupling may not compensate for oscillations in the rotational speed of the grinding plate 12 it reduces the transmission of such oscillations from the grinding process into the drive train.

In this case, to avoid such couplings and the like it is proposed that at least one oscillation-relevant measurement value is detected by means of a sensor system 26 assigned indirectly or directly to the drive train. For example, a current rotational speed of the electric motor 14 (actual rotational speed 28 of the electric motor 14) is detected as an oscillation-relevant measurement value by detecting a rotational speed of the motor shaft 18 or a measurement of the rotational speed of the motor shaft 18, for example a temporal derivative of the rotational speed. A difference between the actual rotational speed 28 and a predetermined or predeterminable desired rotational speed 30 of the electric motor 14 is supplied as a control deviation to a controller 32 functioning as a rotational speed controller, in particular a controller 32 in the form of a PI-controller 32. The controller 32 produces a control variable 34 at its output. This is supplied to the electric motor 14 or a frequency converter 36 arranged upstream of the electric motor 14 and represents a superimposition of an operating torque based on the desired rotational speed 30 and an additional torque based on the control. The controller 32 is a functional unit of a control device 38, namely a control device 38 for the activation of the electric motor 14 with optimal damping or for the indirect activation of the electric motor 14 with optimal damping, in the form of an activation of the frequency converter 36 arranged upstream of the electric motor 14.

Figure 2:
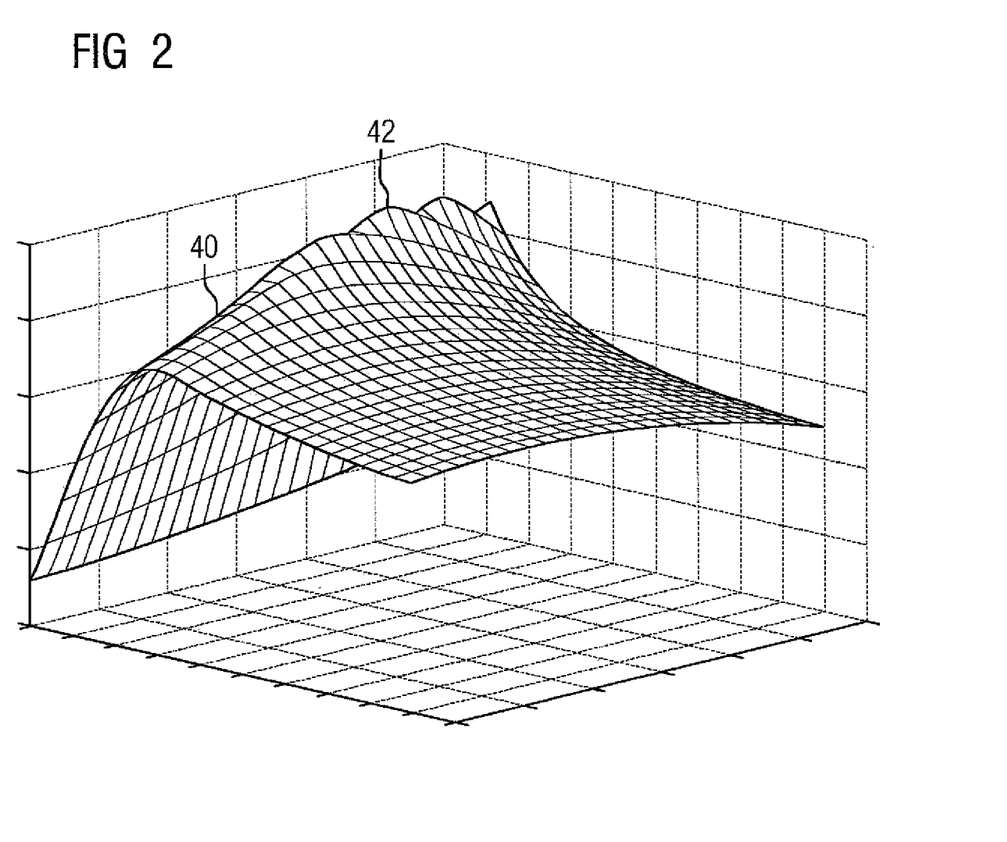
FIG. 2 shows a graphic view of degrees of damping recorded experimentally or within the context of a simulation as a function of two controller parameters and FIG. 3 shows a diagram with a real time analysis of a drive train dynamic of the vertical mill in the form of the torque of the motor shaft (gearing input shaft).

The view in FIG. 2 shows the degree of damping as a function of two controller parameters of the controller 32, namely as a function of an amplification factor Kp determining the proportional element of the controller 32 and a reset time Tn, determining the integral element of the controller 32, of the controller 32 then designed as a PI-controller. The resulting degree of damping for individual controller parameters is plotted on the z-axis facing upwardly in the view and the different controller parameters which are plotted on both axes in the horizontal plane produces a three-dimensional surface 40 with at least one extreme value 42. The controller parameters belonging to the extreme value 42, i.e. the amplification factor Kp belonging to the extreme value 42 and the reset time Tn belonging to the extreme value 42, represent the optimal parameters of the controller 32 for the activation of the electric motor 14 or the frequency converter 36 arranged upstream of the electric motor 14 with optimal damping.

An extreme value search is possible within the total achievable degree of damping illustrated in FIG. 2 by the three-dimensional surface 40, within the context of a method for optimizing the controller parameters. The extreme value search may take place automatically, for example by means of a functionality encompassed by the control device 38 and designed therefor. The extreme value search finds at least local extreme values 42 (gradient method) and—depending on the design—also an absolute extreme value 42. The data shown by way of example in FIG. 2 in this case are either recorded experimentally or as a result of a simulation of the respective vertical mill 10. The controller parameters belonging to the extreme value 42, determined in each case automatically within the context of the extreme value search, i.e. for example an amplification factor Kp and an associated reset time Tn, are applied to the controller 32 and used for activation of the electric motor 14 or the frequency converter 36 arranged upstream of the electric motor 14 with optimal damping.

However, reference should also be made to the fact that the controller parameters which are able to be thus determined produce a highly dynamic and variable air gap torque in the electric motor 14. This acts positively on the oscillating behavior of the drive train but at the same time results in a high thermal and mechanical load for the frequency converter 36 as well as the electric motor 14.

In order to ensure the greatest possible freedom and process stability for the operator of the vertical mill 10, the controller parameters have to be set at least initially according to the greatest possible degree of damping, irrespective of whether such a high degree of damping is actually required during operation. As a result, the frequency converter 36 and the electric motor 14 are subjected to considerably greater stress than is generally required.

A technical solution for this problem has hitherto not been required and is accordingly also not known. The sensor system 26 used for the control with optimal damping, however, at the same time also delivers information about the current drive train dynamics. The controller parameters may be adaptively adjusted using an automatic evaluation of the drive train dynamics, for example by means of the control device 38. Accordingly, an addition to the approach previously set forth is that an excitation behavior of the drive train, which is always variable due to different compositions and/or material properties, is evaluated as a measurement of the respectively required damping. Proceeding from a set of controller parameters determined within the context of the extreme value search, the controller parameters are adaptively adjusted, resulting in less damping than might be achievable with the optimal controller parameters, as long as within the context of the automatic evaluation of the drive train dynamics, this results in the drive train dynamics detected by means of the sensor system 26 remaining within predetermined or predeterminable limits.

In this manner, the optimization range of the operator remains unrestricted, with the frequency converter 36 and the electric motor 14 being subjected to less stress at the same time. Moreover, by means of such an adaptive adjustment of the controller parameters, an improvement of the efficiency of the vertical mill 10 may be achieved as well as an increase in the service life of the frequency converter 36 and the electric motor 14 as high electrical peak loads are reduced.

Figure 3:
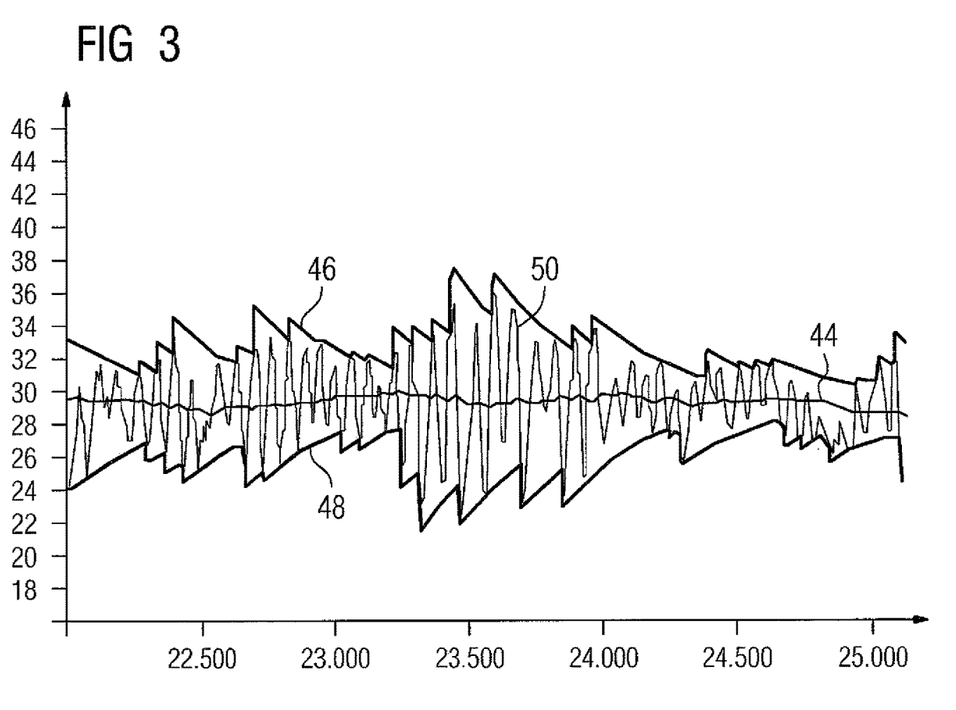

For explaining such an adaptive adjustment, the view in FIG. 3 shows a snapshot of the torque dynamics of the drive train. By a combined arrangement of, for example, PT1 functional units and MIN/MAX functional units, a mean torque 44 and an upper envelope curve 46 and a lower envelope curve 48 of the torque 50 are formed. The spacing between the two envelope curves 46, 48 is at any given time a measurement of the current drive train dynamics. This serves as a basis for the decision regarding the adaptive adjustment of the controller parameters. As long as a predetermined or predeterminable threshold value relative to the drive train dynamics is not exceeded, the degree of damping may be reduced or maintained. If the threshold value is exceeded, the degree of damping is increased, for example, similar to the previously described extreme value search by continuing on the surface 40 in the direction of the extreme value 42.

Alternatively or additionally, a real time frequency analysis of the torque 50 or the observed rotational speed may also be considered. Then the level of relevant frequencies may be specifically observed, i.e. for example a natural frequency or one of the aforementioned excitation frequencies occurring substantially during operation. Then when observing this/these frequency/frequencies it may be determined whether the vertical mill 10 swings up and accordingly the degree of damping has to be increased or whether the current degree of damping is sufficient.

The invention claimed is:

1. A method of controlling a drive system for a vertical mill having a grinding plate driven by an electric motor and a drive train comprising a gearbox for rotation about a vertical axis, with the electric motor and the grinding plate representing mass inertia elements in an oscillating system which are connected by the gearbox operating as a torsion spring element, the method comprising:
measuring a rotational speed variation of at least one of the mass inertia elements;
governing the electric motor by way of a controller to minimize the measured rotational speed variation;
parameterizing the controller for governing the electric motor with at least one adjustable controller parameter which is selected to minimize maximum reaction torques resulting in the gearbox when a sinusoidal excitation is imparted on the drive train by the grinding plate;
experimentally determining on the vertical mill or determining from a simulation of the vertical mill a plurality of degrees of damping as a function of the at least one adjustable controller parameter,
determining an extreme value by performing an extreme value search in the plurality of degrees of damping, and
applying to the controller the at least one controller parameter based on the determined extreme value.

2. The method of claim 1, further comprising adaptively adjusting the at least one controller parameter as a function of an automatic evaluation of a dynamics of the drive train.

3. The method of claim 2, wherein the dynamics of the drive train is automatically evaluated by taking into consideration a spacing between two envelope curves.

4. The method of claim 1, wherein the electric motor is driven by a frequency converter which is controlled with the at least one controller parameter based on the determined extreme value.

5. The method of claim 1, wherein the controller applies to the electric motor an air gap torque and a superimposed additional torque, with the superimposed additional torque damping the rotational speed variation of the electric motor.

6. The method of claim 1, wherein controller is a PI (proportional-integral) controller and the at least one adjustable controller parameter comprises an amplification factor and a reset time of the controller.

7. A drive system for a vertical mill having a grinding plate rotatable about a vertical axis, the drive system comprising:
an electric motor driving the grinding plate,
a drive train comprising at least one gearbox, and
a control device for drive control of the vertical mill, wherein the control device comprises
a controller configured to execute program instructions which are stored on a non-transitory storage medium and which, when loaded into a memory of the controller, cause the control device to
measure a rotational speed variation of the electric motor or the grinding plate;
govern the electric motor by way of a controller to minimize the measured rotational speed variation;
parameterize the controller for governing the electric motor with at least one adjustable controller parameter which is selected to minimize maximum reaction torques resulting in the gearbox when a sinusoidal excitation is imparted on the drive train by the grinding plate,
experimentally determine on the vertical mill or determine from a simulation of the vertical mill a plurality of degrees of damping as a function of the at least one adjustable controller parameter,
determine an extreme value by performing an extreme value search in the plurality of degrees of damping, and
apply to the controller the at least one controller parameter based on the determined extreme value.

8. The drive system of claim 7, wherein the electric motor is driven by a frequency converter which is controlled by a controller parameter corresponding to the determined extreme value.

9. The drive system of claim 7, wherein the controller applies to the electric motor an air gap torque and a superimposed additional torque, with the superimposed additional torque damping the rotational speed variation of the electric motor.

10. The drive system of claim 7, wherein controller is a PI (proportional-integral) controller and the at least one adjustable controller parameter comprises an amplification factor and a reset delay time of the controller.

11. A vertical mill, comprising:
a grinding plate driven by an electric motor and a drive train comprising at least one gearbox for rotation about a vertical axis,
a drive system comprising a control device for drive control of the vertical mill, wherein the control device comprises
a controller configured to execute program instructions which are stored on a non-transitory storage medium and which, when loaded into a memory of the controller, cause the control device to
measure a rotational speed variation of the electric motor or the grinding plate;
govern the electric motor by way of a controller to minimize the measured rotational speed variation;
parameterize the controller for governing the electric motor with at least B one adjustable controller parameter which is selected to minimize maximum reaction torques resulting in the gearbox when a sinusoidal excitation is imparted on the drive train by the grinding plate,
experimentally determine on the vertical mill or determine from a simulation of the vertical mill a plurality of degrees of damping as a function of the at least one adjustable controller parameter,
determine an extreme value by performing an extreme value search in the plurality of degrees of damping, and
apply to the controller the at least one controller parameter based on the determined extreme value.

12. The vertical mill of claim 11, wherein the electric motor is driven by a frequency converter which is controlled by the at least one adjustable controller parameter corresponding to the determined extreme value.

13. The vertical mill of claim 11, wherein the controller applies to the electric motor an air gap torque and a superimposed additional torque, with the superimposed additional torque damping the rotational speed variation of the electric motor.

14. The vertical mill of claim 11, wherein controller is a PI (proportional-integral) controller and the degrees of damping are determined by an amplification factor and a reset time of the controller.

* * * * *